(12) United States Patent
Hassebrook et al.

(10) Patent No.: US 7,844,079 B2
(45) Date of Patent: Nov. 30, 2010

(54) SYSTEM AND TECHNIQUE FOR RETRIEVING DEPTH INFORMATION ABOUT A SURFACE BY PROJECTING A COMPOSITE IMAGE OF MODULATED LIGHT PATTERNS

(75) Inventors: Laurence G. Hassebrook, Lexington, KY (US); Daniel L. Lau, Lexington, KY (US); Chun Guan, Lexington, KY (US)

(73) Assignee: University of Kentucky Research Foundation (UKRF), Lexington, KY (US)

( * ) Notice: Subject to any disclaimer, the term of this patent is extended or adjusted under 35 U.S.C. 154(b) by 164 days.

(21) Appl. No.: 12/283,818

(22) Filed: Sep. 15, 2008

(65) Prior Publication Data
US 2009/0016572 A1    Jan. 15, 2009

Related U.S. Application Data

(63) Continuation of application No. 10/444,033, filed on May 21, 2003, now Pat. No. 7,440,590.

(60) Provisional application No. 60/382,202, filed on May 21, 2002.

(51) Int. Cl.
*G06K 9/00* (2006.01)
(52) U.S. Cl. .................. 382/108; 353/34; 352/47; 359/263; 345/582
(58) Field of Classification Search ............ 382/100, 382/103, 106, 108, 115, 117, 141, 154, 181, 382/190, 195, 203; 348/61, 77, 135
See application file for complete search history.

(56) References Cited

U.S. PATENT DOCUMENTS

| | | | | |
|---|---|---|---|---|
| 3,566,021 A | * | 2/1971 | Jakes, Jr. | 348/40 |
| 3,636,250 A | * | 1/1972 | Haeff | 358/480 |
| 4,641,972 A | * | 2/1987 | Halioua et al. | 356/604 |
| 4,687,325 A | * | 8/1987 | Corby, Jr. | 356/3.09 |
| 2002/0138000 A1 | * | 9/2002 | Rather et al. | 600/407 |
| 2008/0240502 A1 | * | 10/2008 | Freedman et al. | 382/103 |

* cited by examiner

*Primary Examiner*—Anand Bhatnagar
(74) *Attorney, Agent, or Firm*—Macheledt Bales LLP (57) ABSTRACT

A technique, associated system and program code, for retrieving depth information about at least one surface of an object, such as an anatomical feature. Core features include: projecting a composite image comprising a plurality of modulated structured light patterns, at the anatomical feature; capturing an image reflected from the surface; and recovering pattern information from the reflected image, for each of the modulated structured light patterns. Pattern information is preferably recovered for each modulated structured light pattern used to create the composite, by performing a demodulation of the reflected image. Reconstruction of the surface can be accomplished by using depth information from the recovered patterns to produce a depth map/mapping thereof. Each signal waveform used for the modulation of a respective structured light pattern, is distinct from each of the other signal waveforms used for the modulation of other structured light patterns of a composite image; these signal waveforms may be selected from suitable types in any combination of distinct signal waveforms, provided the waveforms used are uncorrelated with respect to each other. The depth map/mapping to be utilized in a host of applications, for example: displaying a 3-D view of the object; virtual reality user-interaction interface with a computerized device; face—or other animal feature or inanimate object—recognition and comparison techniques for security or identification purposes; and 3-D video teleconferencing/telecollaboration.

29 Claims, 7 Drawing Sheets

SYSTEM AND TECHNIQUE FOR RETRIEVING DEPTH INFORMATION ABOUT A SURFACE BY PROJECTING A COMPOSITE IMAGE OF MODULATED LIGHT PATTERNS

This application is a continuation of U.S. utility patent application Ser. No. 10/444,033 filed 21 May 2003 now U.S. Pat. No. 7,440,590 which was granted priority to U.S. provisional patent application 60/382,202 filed 21 May 2002, both of which were filed on behalf of the assignee hereof for the applicants.

The invention disclosed herein was made with United States government support awarded, in part, by the NASA EPSCoR Cooperative agreement NCC5-222 and proposal number N02R04 D through Western Kentucky University, and in part by support awarded by National Science Foundation under grant EPS-9874764. Accordingly, the U.S. Government has certain rights in this invention.

BACKGROUND OF THE INVENTION

Field of the Invention

In general, the present invention relates to structured light systems that utilize multi-pattern techniques, whereby multiple projected structured light patterns are used to reconstruct an image. More-particularly, the instant invention is directed to a technique and system that employs at least one camera and one projector used in concert for retrieving depth information about at least one surface of an object employing traditional, and new, structured light pattern projections. The unique method, system, and program code of the invention incorporate the projection of a composite image comprising a plurality of modulated structured light patterns, at an object. Recovery of initial pattern information from an image reflected from the object is done for each of the modulated structured light patterns, in a manner that preserves depth information within each recovered pattern. From the depth information, the surface can be reconstructed by way of producing a depth map/mapping thereof.

While many of the known multi-pattern techniques address problems of depth ambiguity, invariance to surface reflectance variations, and depth accuracy, when using the traditional technique of projecting multiple patterns to reconstruct an image in motion, it takes an inordinately long time to capture all the necessary information for reconstruction. The consequence of this is that these known multi-pattern techniques become quite sensitive to object movement during the projection capture process. To address this problem, prior attempts have been made by others to increase the projection/capture rate. Unfortunately, as the projection/capture rate is increased the capture duration decreases the amount of light captured. Synchronization becomes more critical and the SNR of the capture images decreases. More-particularly the applicants' invention is directed to utilizing the spatial dimension that is orthogonal (herein, simply "orthogonal dimension") to the depth distortion (i.e., "phase dimension") to modulate and combine multiple pattern projections into a single composite pattern. Applicants' hereby disclose a new technique that offers a flexible way to systematically combine multi-patterns of structured light obtained using any selected technique, into a single composite pattern that can be continuously projected—thus, minimizing delay between pattern projections—providing for real-time 3D video imaging. Preferably, the multi-patterns are obtained using techniques that benefit from current solutions to depth ambiguity, invariance to surface reflectance variations, and depth inaccuracy. Using a composite pattern projected according to the invention, applicants' have identified a way to identify position and perform face recognition.

The composite pattern technique of the invention enables a wide range of multi-image methods to be utilized on moving objects. By modulating multiple structured light images into separate "channels" along the orthogonal dimension, bandwidth is utilized—just as in communications systems—resulting in a resolution tradeoff along the orthogonal dimension. To further refine the applicants' unique technique, of particular focus is any limitation(s) imposed by current state of the lithographic technology used to make the composite pattern, the number of pixel units along the orthogonal dimension of current camera technology, and monochromatic aberrations traditionally encountered using available optics technology.

DISCUSSION OF BACKGROUND TECHNOLOGY

Classic Structured Light Projection

Typically, light structures function by projecting a predefined source onto a surface and then mapping the corresponding distortion in the light structure to surface features. Structured light measurement techniques provide a useful means by which data about a 3D surface may be acquired without contacting the surface, and used for a wide variety of engineering and industrial applications.

Structured light is the projection of a light pattern (plane, grid, or more complex shape) at a known angle onto an object. 'Light' and 'images' thereof, as used herein, includes electromagnetic (EM) energy radiated throughout the EM spectrum, and more preferably, within the spirit and scope of the invention, while the full EM spectrum is available for carrying out the invention, the focus is on EM emission(s) which fall within an extended range from the ultraviolet category (wavelengths from ~180 nm) through near-infrared (NIR) category (wavelengths from ~2000 nm). In the event EM radiation falling outside the range of ~180 nm through ~2000 nm is used according to contemplated features of the invention, equipment capable of projection and capture of the radiation must be selected to accommodate that radiation. For example, if acoustic frequencies are employed, associated acoustic transmitter and receiving units must be selected for projection and capture of the composite 'image' information for processing to recover the structured 'light' patterns initially modulated to compose the composite that is projected/transmitted at the surface of an object.

One type of traditional light patterning often used in process control machine vision is generated by fanning out a light beam into a 'sheet' of light. When the sheet of light intersects with an object, a bright line of light can be seen on the surface of the object. By viewing this line of light with a camera oriented at an angle, the observed distortions in the line can be translated into height variations. Scanning the object with the light constructs 3D information about the shape of the object, often referred to as active triangulation. This is the basic principle behind depth perception for machines, or 3D machine vision. Since structured lighting can be used to determine the shape of an object in machine vision applications, as well as help recognize and locate an object in other environments. Structured lighting has proven useful in assembly lines implementing process or quality control, by offering an automatic means to check for alignment and component breakage or condition, for example. Stocker Yale, Inc.

distributes an off-the-shelf LASIRIS™ laser projector useful for process control in manufacturing lines to carry out component inspection and alignment.

As pointed out in Daley and Hassebrook, "*Improved Light Sectioning Resolution by Optimized Thresholding,*" *SPIE Proceedings,* 2909, 151-160 (November 1996), traditional approaches to structured light illumination include light stripe projection onto a surface topology and then analyzing the lateral displacements of the reflected pattern to reconstruct the surface topology. While a single spatial frequency of a light stripe pattern may be used to illuminate a relatively flat surface, in the case of rough surfaces, the surface topology is preferably encoded with a sequence of light stripe patterns with successively higher spatial frequencies. Either way, maximum resolution is limited by the maximum spatial frequency used. As spatial frequency increases, the projection system's blurring function causes the light stripes to be coupled thereby decreasing the SNR of the reflected image.

Correctly relating distortion to surface features is fundamental to structured light techniques. Discussion of how this has traditionally been addressed can be found in the technical manuscript of Raymond C. Daley, entitled "*Design, Implementation and Analysis of Structured Light Systems,*" (1997)—hereafter "Daley (1997)"—submitted in fulfillment of a Masters of Science degree, and labeled ATTACHMENT B as incorporated by reference in applicants' pending provisional application for background technical discussion. One fundamental geometric mechanism for creating the distortion is depicted in FIG. 1 of Daley (1997): it is the triangulation which consists of a source incident on a surface at a known angle, displaced laterally relative to a fixed viewing perspective, by the surface. Lateral displacement $\Delta x$ can be found by viewing or measuring the location of the reflected source, and surface height deviation $\Delta h$ is determinable by trigonometry.

FIG. 6 of Daley (1997) illustrates an example of a simulated single-stripe surface scan where the surface has been modeled as a 3D Gaussian pulse and the stripes modeled as a light plane intersecting the surface at a fixed projection angle. Only one light plane is depicted in FIG. 6, Daley (1997), representing the stripe projected onto the surface, while multiple intersections between the light strip and the surface are shown to represent a scan across the surface. From Daley (1997) FIG. 6 one can see how the stripes map to the surface contour. For each stripe image received, only one slice or section of the surface can be reconstructed. In order to reconstruct the entire surface, it is necessary to move the surface or projector and receiver such that the stripe is projected and viewed at each point on the surface to be measured. This is quite a cumbersome process.

FIG. 7 of Daley (1997) shows how the stripe projections from the simulated scan in FIG. 6, might appear if viewed by the receiver positioned directly above the surface. This 2D image represents lateral offsets which correspond to displacement $\Delta x$ from Daley (1997) FIG. 1, thereby allowing surface height to be determined at the scanned intervals (pre-registration/calibration required). Daley (1997) discusses several of the difficulties encountered in converting a 2D stripe image into 3D data. A technique called multi-stripe projection extends single-stripe system by scene illumination with multiple slits or stripes that may be spatially modulated. Daley (1997) beginning at page 21, and pages 73-79 discusses two major components to structured light systems, namely, the projection and imaging subsystems designed to transmit and capture reflected light while maintaining or enhancing information in the light structure.

FIGS. 5 and 6 of Hassebrook, Daley, and Chimitt, "*Application of Communication Theory to High Speed Structured Light Illumination,*" Edited by Harding and Svetkoff, *SPIE Proceedings,* 3204(15), 102-113 (October 1997), concerns a structured light technique advancement made by at least one of the applicants hereof Hassebrook, et al. (October 1997) draws an analogy between the projection of a structured light pattern to encoding a surface with a spatial carrier "image" analogous to a carrier signal from communications theory. Structured light systems were treated as wide bandwidth parallel communications channels. Surface characteristics (including topology) act to modulate the carrier image. Known SLM (spatial light modulator) devices allow one to program the encoding of the surface with a sequence of encoded patterns, as depicted in FIG. 5 and FIG. 6 of Hassebrook, et al. (October 1997).

In an effort to improve structured light systems (to which communications analogies were applied) with an eye toward optimizing spatial frequency while maintaining a fixed range resolution of the light-stripes, a technique was presented to enhance lateral resolution by multiplexing the light structure to produce interlaced encoded images, see Daley and Hassebrook, "*Channel capacity model of binary encoded structured light-stripe illumination,*" Applied Optics, 37(17), 3689-3696, June (1998). FIG. 8 therefrom illustrates a first set of eight different stripe patterns used to encode the object; the stripe pattern having the highest spatial frequency shown at the upper left in FIG. 8 (spatial period of 8 pixels/cycle). A second set of stripe-encoded images was captured identical to that shown in FIG. 8 except that all the stripe patterns are offset ¼-wavelength of the highest stripe frequency (¼*8, or 2 pixels/cycle). As explained by Daley and Hassebrook, June (1998) the two sets of images are binarized. An encoded image, one for each set, is generated as a weighted sum of the eight binary images. To interlace the two encoded images, stripe edge locations were determined. By combining the low bit images from both sets, a four-level encoded image was obtained, as illustrated in FIG. 9 of Daley and Hassebrook, June (1998).

As mentioned, known structured-light illumination techniques used for automated inspection and measuring surface topologies, are cumbersome. Traditional 3D acquisition devices use a single scanning laser stripe scanned progressively over the surface of the target object, placing a burden on the object to remain static and a burden on data acquisition to capture all the stripe images. In an attempt to reduce computational burdens of scanning and processing each scan position of the laser stripe, certain methods have been devised to project and process structured-light patterns, such as multi-stripe and sinusoidal fringe patterns, that illuminate the entire target surface at the same time. Specifically, one known technique focused at addressing the ambiguity and the albedo problems is to encode the surface repeatedly with multiple light striped patterns with variable spatial frequencies. These known multi-stripe patterns suffer from drawbacks such as introducing ambiguities in the surface reconstruction around surface discontinuities, overly sensitive to surface reflectance variations (i.e., albedo), and/or they suffer from lower lateral resolution caused by the required spacing between stripes. These known systems are simply not suitable for real-time imaging.

Thus, and according to the invention, a very unique approach is outlined herein as supported by rigorous mathematical and engineering analyses performed by the applicants. Applicants have discovered a structured-light patterning that allows, with a single projected composite image, the measuring of surface topologies that addresses issues of ambiguities, higher accuracy, and less sensitivity to albedo variations.

SUMMARY OF THE INVENTION

It is a primary object of this invention to provide a technique and system for retrieving depth information about at least one surface of an object employing traditional, and new, structured light pattern projections. The unique method, system, and program code disclosed and supported herein incorporate the projection of a composite image comprising a plurality of modulated structured light patterns, at an object; and recovery of initial pattern information from an image reflected from the object, for each of the modulated structured light patterns, in a manner that preserves depth information within each recovered pattern. From the depth information, the surface can be reconstructed by way of producing a depth map/mapping thereof. The nature of applicants' new technique permits the depth map/mapping to be utilized in a host of applications, for example: displaying a 3D view of the object; virtual reality type human/user-interaction interface with a computerized device; face—or other animal feature, or any feature of an inanimate object, distinguishable by surface characteristics—recognition and comparison techniques for security or identification purposes; and 3D video teleconferencing/telecollaboration.

As one will appreciate, the unique features supported hereby may provide advantages of display clarity, versatility in applications/functionalities, speed, efficiency, overall system cost-reduction, permitting reliable display information to be communicated to a viewer. Specific advantages of providing the new method and associated system include, without limitation:

(a) Ease of operability and design simplicity—The invention provides an ability to automatically recover depth information about an object under observation with a camera, in a manner useful and readily adaptable to new real-time 3D imaging, 3D object analysis (e.g., face recognition, component identification and alignment, etc., whereby unique topologies are identified and matched) as well as adaptable to a wide variety of other new commercial/industrial and research/scientific applications.

(b) 3D image process design flexibility and versatility of use—The technique of the invention can be tailored for use with a wide variety of EM emissions/light patterns and patterning projected (for example, from ultraviolet through NIR ranges) and captured using suitable associated imaging components, subsystems, and computing capabilities to carry out the applications. The processing may be carried out in digital or analog equivalents.

(c) Manufacturability and overall system cost reduction—The unique technique and system of the invention can be tailored to current, as well as any under development or yet-to-be-developed, imaging systems providing a cost-effective means by which systems can be upgraded, or sold as OEM.

(d) Time required to acquire and generate depth information and associated maps of a surface can be reduced according to the invention, making projection and capture of the light/EM radiation suitable for the real-time applications contemplated hereby.

Briefly described, once again, the invention includes a method, as well as associated system and computer executable program code on a computer readable storage medium, for retrieving depth information about at least one surface of an object. The method, system and code incorporate(s) the steps of: projecting a composite image comprising a plurality of modulated structured light patterns, at the object; capturing an image reflected from the surface; and recovering pattern information from the reflected image, for each of the modulated structured light patterns. Pattern information is preferably recovered for each of the modulated structured light patterns used to create the composite, by performing a demodulation of the reflected image. Reconstruction of the surface can be accomplished by using depth information from the recovered patterns to produce a depth map/mapping thereof. Preferably, each signal waveform used for the modulation of a respective structured light pattern, is distinct from each of the other signal waveforms used for the modulation of other structured light patterns used to create a composite image; these signal waveforms may be selected from suitable types including: frequency shifted waveforms, phase shifted waveforms, random noise waveforms, and encoded waveforms. Any combination of distinct signal waveforms may be employed for modulation of a set of structured light patterns used to create a composite image, provided the waveforms used are uncorrelated with respect to each other. The technique may be carried out using digital processing or analog electronic circuitry.

As one will appreciate, there are many further distinguishing features of the system and technique, and associated program code, of the invention. A surface reconstructed by way of a depth map, may simply be displayed as a 3D grayscale or color still image or video imaging (boxes 144, FIG. 13). Additional applications of the depth mapping include (boxes 146 and 148, FIG. 13): comparing the depth map with a plurality of stored depth map records of an animal feature, such as a face or hand, or of any other feature such as the distinguishing surface characteristics of a component being assembled, and so on, for purposes of identification or recognition of the object; or one may obtain orientation or positional data about the object from the depth map, such as roll, pitch, and yaw angle data, or positional data (coordinates for points or arrays) for use in connection with operation of a user-interaction interface for a wide variety of computerized devices. The composite image can be made up of structured patterns projected as electromagnetic energy radiated throughout the electromagnetic spectrum, and more-preferably within a wavelength range from about 180 nm through 2000 nm, inclusive. The step of capturing a reflected image can include the receiving and recording of pixel intensity and pixel wavelength (e.g., using RGB—red, green, blue—color display capable video) of the energy reflected from the surface. Components suitable for projection and capture of the composite image are selected according to the energy/wavelength range of the light patterns employed.

Further unique to the invention is an opportunity to, after capturing the first reflected image, project a second composite image comprising a second plurality of modulated structured light patterns, at the object so that second pattern information from a second reflected image can be recovered for each of the second plurality of modulated structured light patterns. This feature of time-sequencing composites, an example of which is depicted by the isometrics in FIGS. 9A-9B, offers the capability to produce a depth map of the surface(s) of the object using pattern information recovered from two, or more, projected composite images. Such a depth map can reconstruct several surfaces of the object from reflected imaged information received sequentially in time.

In another aspect of the invention a second composite image comprising a second plurality of modulated structured light patterns can be projected, at the object. Here, preferably, the first and second composite images are projected using, respectively, electromagnetic energy radiated within a first and a second wavelength range, whereby the first and second wavelength ranges have no overlap making the composites 'bandwidth limited'. An example of this alternative is depicted by the isometric drawing in FIG. 7. Such a technique provides for a means by which, whether done simultaneously or sequentially, two or more composite images can be projected at the object to gather additional surface information—providing the capability to recover additional depth information and, thus, produce more detailed and/or larger depth mappings.

In yet another aspect of the invention, a second composite image comprising a second plurality of modulated structured light patterns, is projected at the object; however, the projection of the second composite image is oriented such that orthogonal and phase dimensions of the second composite image are unaligned from the orthogonal and phase dimensions of the first projected composite image. An example of this alternative is depicted by the isometric drawing in FIG. 8. Once again, as in the case of the non-overlapping frequency range alternative above, this aspect of the invention provides an option for simultaneous or sequential projection: two or more composite images can be projected at the object to gather additional surface information.

The system for retrieving depth information about at least one surface of an object under observation by at least one camera, as characterized includes: at least one projector/transmitter adapted for projecting at least one composite image at the object; the camera/capture unit adapted for capturing an image being reflected from the surface; and a processor adapted for recovering pattern information from the reflected image, for each modulated structured light pattern, the depth information retrievable from the recovered pattern information. A second, third, and so on, projector/transmitter adapted for respectively projecting a second, third, and so on, composite image accordingly comprising a second, third, and so on, plurality of modulated structured light patterns, at the object, may be added to carry out the additional distinguishing features discussed above. Similarly a second, third, and so on, camera/capture unit adapted for respectively capturing a second, third, and so on, reflected image may be added to pair with additional projectors employed to project second, third, and so on, composites. The addition of transmitter-receiving unit pairs to carry out composite projection and associated reflected image capture, can be programmed to perform the unique alternative aspects of the invention discussed throughout, including: time-sequencing of composite images, non-overlapping structured light frequency ranges (bandwidth limited composites), and composite unalignment techniques.

The computer executable program code on a computer readable storage medium for retrieving depth information about at least one surface of an object under observation by at least one camera, as characterized includes: a first program sub-code for projecting a composite image comprising a plurality of modulated structured light patterns, at the object; a second program sub-code for recovering pattern information from an imaged reflected from the surface, for each of the plurality of modulated structured light patterns; and a third program sub-code for reconstructing the surface using the recovered pattern information. The program code preferably also includes an initial program sub-code for modulating with a distinct signal waveform, each of a respective structured light pattern to obtain the plurality of modulated structured light patterns. The second program sub-code can comprise instructions for performing a demodulation of the reflected image to produce recovered pattern information for each of the plurality of modulated structured light patterns; and the third program sub-code can comprise instructions for producing a depth map of the surface using the recovered pattern information.

Furthermore, additional program sub-code can be employed for the comparing of the depth map with a plurality of stored depth map records of an animal feature for purposes of identification of the object; and/or additional program sub-code can be employed for obtaining orientation data about the object from the depth map for use as explained above; and/or program sub-code can be employed for carrying out the projection of second, third, and so on, composite images utilizing the unique composite time-sequencing, non-overlapping structured light frequencies (bandwidth limited composites), or composite unalignment techniques explained herein; and/or program sub-code may be employed for the recovery of respective pattern information for each additional composite so projected, to generate even move-complex depth maps-all supported and contemplated hereby.

BRIEF DESCRIPTION OF THE DRAWINGS

For purposes of illustrating the innovative nature plus the flexibility of design and versatility of the preferred technique and system, and associated program code, supported and disclosed hereby, the invention will be better appreciated by reviewing the accompanying drawings (in which like numerals, if included, designate like parts). One can appreciate the many features that distinguish the instant invention from known or traditional techniques. The drawings and any attachments hereto have been included to communicate the features of the innovative system and associated technique of the invention as well as the rigorous analysis performed by the applicants by way of example, only, and are in no way intended to unduly limit the disclosure hereof.

FIGS. 5A-5D are pictorials representing various stages of carrying out an embodiment of the invention according to EXAMPLE 1C as follows.

DETAILED DESCRIPTION OF EMBODIMENTS DEPICTED IN DRAWINGS

Figure 1:
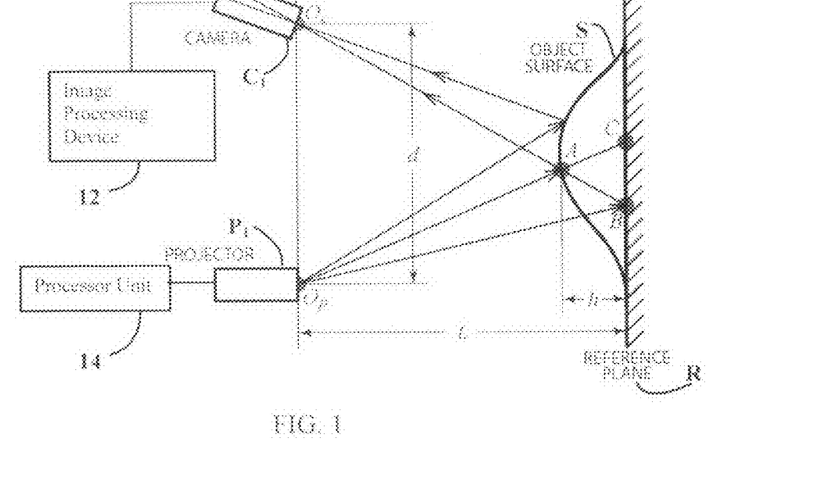
FIG. 1 schematically depicts a projector-camera, or other suitable transmitter-receiver, system 10 for carrying out the technique of the invention, having projector/transmitter $P_1$ for projecting a composite image onto object surface(s) S and camera/capture unit $C_1$ capturing the image that is accordingly reflected from S.
Figure 2:
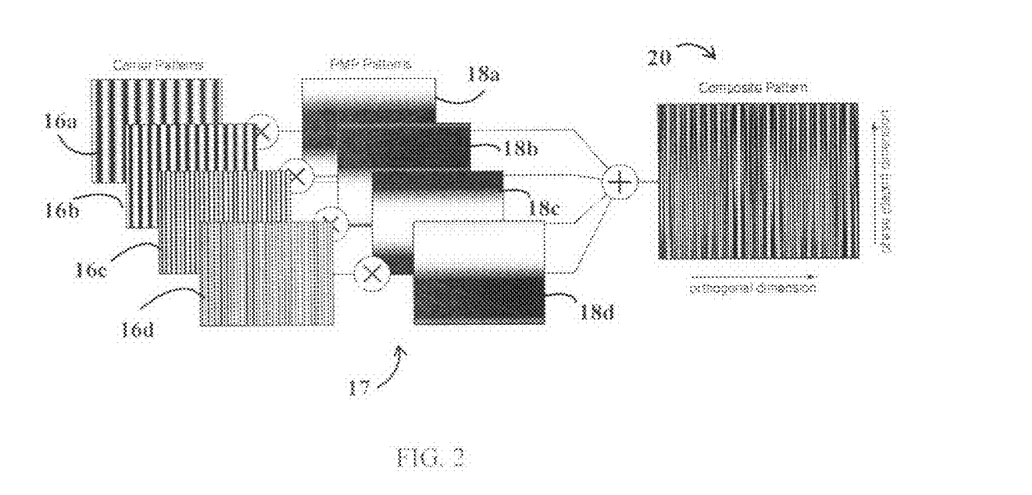
FIG. 2 is a pictorial representing one embodiment depicting data/information/signal patterns combinable using modulation technique(s) to create a composite image 20 according to the invention.

In connection with discussing the figures, occasional reference will be made to the FIG. 13 flow diagram which details core and further distinguishing features of a technique of the invention at 130. FIG. 1 schematically depicts a projector-camera system 10 for carrying out the technique of the invention, having projector $P_1$ for projecting a composite image onto object surface(s) S and camera $C_1$ capturing the image that is accordingly reflected from S. FIG. 2 is a pictorial representing one embodiment depicting data/signal/information patterns combinable using modulation technique(s) to create the composite image 20. As shown, multiple structured light patterns are modulated (box 132, FIG. 13) utilizing suitable carrier patterns 16a-16d and combined 17 into a composite pattern 20. Traditional multi-frame patterns may be used produced by any suitable technique such as Phase Measuring Profilometry (PMP) patterns 18a-18d, Linearly Coded Profilometry (LCP), as well as any traditional or new technique capable of generating a plurality of patterns, preferably at least from and throughout ultraviolet, visible, and NIR ranges, that may be modulated and combined through processing (computerized unit 14) and projected $P_1$ as a composite 20 onto one or more selected surfaces S of a target object (box 134, FIG. 13). Additional composites may, likewise, be projected (box 136, FIG. 13).

The individual patterns 18a-18d of FIG. 2 are spatially modulated 16a-16d, 17 along the orthogonal dimension, perpendicular to the phase dimension—each of which are referenced, here. While many suitable patterns may be modulated according to the invention, for simplicity of discussion, the focus of discussion herein is on coding and decoding procedures of composite patterns for the PMP technique, by way of example. Employing system 10, a 'single' frame of a composite PMP pattern is formed 20 and projected through $P_1$ to the target object S. The reflected image is received and captured by camera $C_1$ (box 138, FIG. 13) and decoded employing suitable processing, computerized unit 12, to retrieve the multiple PMP frames from the captured image (box 140, FIG. 13) so that the phase distribution distorted by the object depth can be calculated (box 142, especially 142a, FIG. 13). Pattern information is preferably recovered for each of the modulated structured light patterns 18a-18d used to create the composite 20, by performing a demodulation of the reflected image (box 140, FIG. 13). The depth, or depth map/mapping, of the object can accordingly be reconstructed out of the phase (box 142, especially 142b, FIG. 13), relying on traditional structured light techniques for doing so while utilizing classic demodulation practices of communications theory, tailored to the type of structured light patterning used to create the composite. Once again, for the embodiments depicted in FIGS. 2-6 the composite patterning technique used to recover the four structures from the captured image while preserving depth information about the surface S, was the PMP technique, by way of example, only.

Preferably, modulation of each structured light pattern (box 132, FIG. 13) used to project a given composite image, is done with a distinct signal waveform. The signal waveforms may be selected from many suitable types, including those listed here: frequency shifted waveforms, phase shifted waveforms, random noise waveforms, and encoded waveforms. Any combination of distinct signal waveforms may be employed for modulation of a set of structured light patterns used to create a given composite image, provided the waveforms used are uncorrelated with respect to each other.

Figure 3:
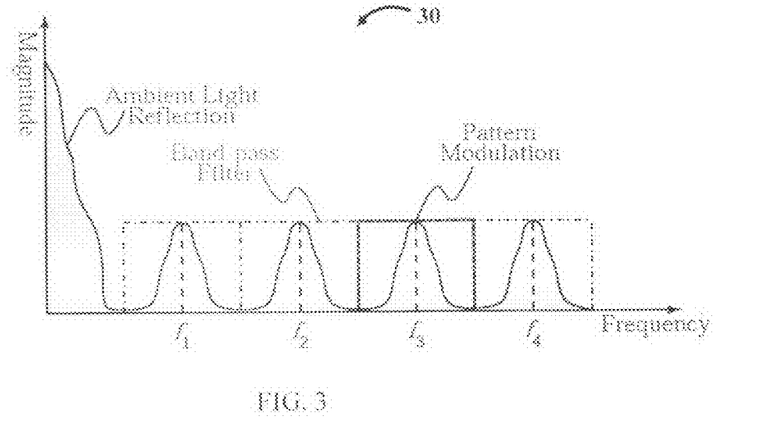
FIG. 3 graphically depicts the frequency spectrum of an example captured image reflected from surface S for the four channel composite pattern represented in FIG. 2. Note that modulated pattern information is recoverable from the reflected image.
Figure 4:
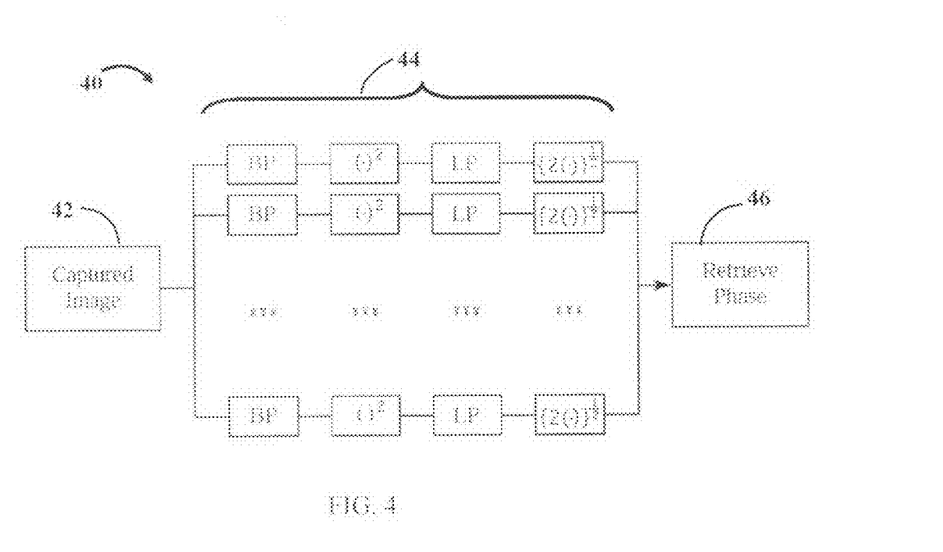
FIG. 4 is a high-level block diagram of a process suitable for use to recover the pattern information for each modulated structured light pattern. The image is demodulated by suitable digital or equivalent analog circuit signal processing to recover each individual pattern within the captured composite, which now contains surface depth information.

In connection with the following discussion concerning derivation and analysis by way of example, employing PMP, FIGS. 1-6 will occasionally be referenced. FIG. 3 graphically depicts at 30, along the orthogonal dimension, the frequency spectrum of an example captured image reflected from surface S for the four channel composite pattern represented in FIG. 2. Note that modulated pattern information is recoverable from the reflected image. FIG. 4 is a high-level block diagram of a process 40 suitable for use to recover the pattern information for each modulated structured light pattern; for reference see also FIG. 13 at 140 and 142. The captured image 42 is filtered and demodulated (represented at 44) to recover each individual pattern containing the desired depth information. Finally phase information is retrieved 46. While FIG. 4 depicts components of digital processing, the technique of the invention is suitably carried out using analog electrical component equivalents, as contemplated hereby.

EXAMPLE 1A

Derivation & Analysis Discussion—Composite Patterning Employing PMP

The PMP range finding method has several advantages, it is a pixel-wise calculation, resistant to ambient light, resistant to reflection variation and it can have as few as three frames for whole-field depth reconstruction. Sinusoid patterns are projected and shifted by a factor of $2\pi/N$ for N times as $$I_n^P(x^P, y^P) = A^P + B^P \cos(2\pi f_\phi y^P - 2\pi n/N) \qquad \text{Eqn. (1)}$$

where $A^P$ and $B^P$ are the projection constants and $(x^P, y^P)$ is the projector coordinates. The $y^P$ dimension is in the direction of the depth distortion and is called the phase dimension. On the other hand, $x^P$ dimension is perpendicular to the phase dimension, so it has been coined herein, the orthogonal dimension. Thus, frequency $f_\phi$ of the sinusoid wave is in the phase direction/dimension. The subscript n represents the phase shift index and n=1, 2, ..., N, where N is the total number of phase shifts.

The reflected intensity images from the object surface after successive projections are $$I_n(x,y) = \alpha(x,y) \cdot [A + B \cos(2\pi f_\phi y^P + \phi(x,y) - 2\pi n/N)] \quad \text{Eqn. (2)}$$

where (x,y) are the image coordinates and $\alpha(x,y)$ is the reflectance variation or the albedo. The pixel-wise phase distortion $\phi(x,y)$ of the sinusoid wave corresponds to the object surface depth. The value of $\phi(x,y)$ is determined from the captured patterns by $$\phi(x,y) = \arctan\left[\frac{\sum_{n=1}^{N} I_n(x,y)\sin(2\pi n/N)}{\sum_{n=1}^{N} I_n(x,y)\cos(2\pi n/N)}\right] \quad \text{Eqn. (3)}$$

Since albedo, $\alpha(x,y)$, is cancelled in this calculation, one can see that depth through this approach is independent of the albedo.

When calibrating the range finding system, the phase map of the reference plane $\phi_r(x,y)$ is pre-calculated from projections on the reference plane (labeled R in FIG. 1). The depth of the object surface S with respect to the reference plane R is readily obtained using simple geometric relationships. As shown in FIG. 1, the distance between the projector lens center, $O_p$, to the camera lens center, $O_c$, is d. Both the projector and the projector-camera plane are a distance L from the reference plane. The height, h, of the object at a given point A can be determined by $$h = \frac{\overline{BC} \cdot (L/d)}{(1 + \overline{BC}/d)}, \quad \text{Eqn. (4)}$$

where $\overline{BC}$ is proportional to the difference between the phase at point B, $\phi_B$, and the phase at point C, $\phi_C$, as $$\overline{BC} = \beta(\phi_C - \phi_B) \quad \text{Eqn. (5)}$$

The constant $\beta$, as well as other geometric parameters, L and d, are determined during calibration procedure. The phase value calculated from Eqn. (3) is wrapped in the range value of $(-\pi, \pi]$ independent of the frequencies in phase direction. Phase unwrapping procedure retrieves the non-ambiguous phase value out of the wrapped phase. With relatively higher frequencies in phase direction, the range data have higher signal-to-noise-ratio (SNR) after non-ambiguous phase unwrapping.

In order to combine multiple patterns into one single composite image 20, each individual pattern is modulated along orthogonal direction with a distinct carrier frequency and then summed together as depicted by FIG. 2. Therefore, each channel in the composite image along the orthogonal direction represents the individual pattern used in PMP for the phase calculation. Similar to the patterns projected in multi-frame approach as in Eqn. (1), the image patterns to be modulated are governed by $$I_n^P = c + \cos(2\pi f_\phi y^P - 2\pi n/N) \quad \text{Eqn. (6)}$$

A constant c is used here to offset $I_n^P$ to be non-negative values. One can appreciate that negative signal values will cause an unusable demodulation employing this amplitude modulation (AM) based demodulation method, as discussed later. The signal patterns are then multiplied with cosine wave with distinct carrier frequencies along the orthogonal direction. The composite pattern accumulates each channel such that $$I^P = A^P + B^P \cdot \sum_{n=1}^{N} I_n^P \cdot \cos(2\pi f_n^P x^P) \quad \text{Eqn. (7)}$$

where $f_n^P$ are the carrier frequencies along the orthogonal direction and n is the shift index from 1 to N. The projection constants $A^P$ and $B^P$ are carefully calculated as $$A^P = I_{min} - B^P \cdot \min\left\{\sum_{n=1}^{N} I_n^P \cdot \cos(2\pi f_n^P x^P)\right\} \quad \text{Eqn. (8)}$$

$$B^P = \frac{(I_{max} - I_{min})}{\left(\max\left\{\sum_{n=1}^{N} I_n^P \cdot \cos(2\pi f_n x^P)\right\} - \min\left\{\sum_{n=1}^{N} I_n^P \cdot \cos(2\pi f_n x^P)\right\}\right)} \quad \text{Eqn. (9)}$$

so that the projection intensity range of the composite pattern falls into $[I_{min}, I_{max}]$. In order to increase the SNR, $B^P$ should reach its maximum value allowed and therefore, $[I_{min}, I_{max}]$ should match the intensity capacity of the projector to retrieve optimal depth information.

In this example, orthogonal modulation frequencies $f_n^P$ have been selected to be evenly distributed and away from zero frequency. This modulation is analogous to classic AM modulation. No patterns have been modulated in the "DC" or baseband channel. Although the bandwidth of the composite pattern is degraded by losing baseband channel, the modulation pattern is less sensitive to ambient light. Ideally, the reflected composite pattern image on the target object surface captured by the camera is $$I_{CP}(x,y) = \alpha(x,y)\left\{A + B \cdot \sum_{n=1}^{N} I_n'(x,y) \cdot \cos(2\pi f_n x)\right\} \quad \text{Eqn. (10)}$$

where $$I_n'(x,y) = c + \cos(2\pi f_\phi y^P + \phi(x,y) - 2\pi n/N). \quad \text{Eqn. (11)}$$

where $\alpha(x,y)$ is the albedo and $\phi(x,y)$ is the distorted phase as in Eqn. (2). The actual carrier frequencies $f_n$ in the camera view may be different from the $f_n^P$ due to perspective distortion between the projector $P_1$ and the camera $C_1$. To make the modulation frequency $f_n$ as independent as possible of the topology of the object surface on each orthogonal line, the camera and projector may be carefully aligned to share approximately the same world coordinates both in orthogonal direction and depth direction. If the orthogonal and phase axes of the camera and projector fields have a relative rotation between them, the orthogonal carrier modulation of the projector may leak into the phase component captured by the camera.

Since projector $P_1$ and camera $C_1$ digitally sample the projection pattern and captured image, the detection of the high frequency carrier wave and the recovery procedure rely heavily on the intensity and the spatial resolution of the projector and camera system. Appropriate carrier frequency, $f_n^P$, has to be carefully assigned. Selection of the carrier frequency $f_n^P$ is dependent on the projector and camera quality, as well as the experimental setup. Preferably, while adjacent carrier $f_n^P$ should be spread out as much as possible to minimize the channel leakage, due to limitations of spatial and intensity resolution carrier $f_n^P$ should be confined to a certain range for reliable depth recovery.

Reflected images are processed, here, as 1-D raster signals where each line along the orthogonal dimension is an independent signal vector. The received orthogonal spectrum 30 for four composite pattern channels, in a typical signal vector, is illustrated in FIG. 3. Here, the four carrier frequencies are evenly distributed and are separated from the ambient light reflection at baseband. The captured image is processed, as a set of 1-D signal vectors, by band-pass filters to separate out each channel. To achieve uniform filtering for the channels, the band-pass filters are centered at $f_n$ and are all derived from the same low-pass Butterworth filter design; that is to say, they all have the uniform passband span and are symmetric at $f_n$. The Butterworth filter is used in this stage for smoother transition and minimal side-lobe ripple effect. The order of the Butterworth filter is carefully selected to reduce the crosstalk between channels. A compromise is made between side-lobe effects and cross-talk in order to obtain acceptable reconstruction performance. Cutoff frequencies for each band are designed such that $$f_n^c = \frac{1}{2}(f_{n-1} + f_n) \qquad \text{Eqn. (12)}$$

where n=1, 2, 3, ..., N and $f_0$=0 which is the baseband channel. The orthogonal signal vectors after 1-D band-pass filtering are $$I_n^{BP}(x,y) = I_{CP}(x,y) * h_{BP}^n(x) \approx I_n'(x,y) \cdot \cos(2\pi f_n x) \qquad \text{Eqn. (13)}$$

where * is the convolution operator and $h_{BP}^n(x)$ is the band-pass filter along orthogonal direction centered at frequency $f_n$. The baseband image $I_n'(x,y)$ is assumed to be band limited along the orthogonal dimension with a bandwidth less than or equal to the filter $h_{BP}^n(x)$ bandwidth.

The filtered images have to be demodulated to retrieve each individual pattern, $I_n'(x,y)$. In the demodulation process, two critical factors are considered: First, the perspective distortion causes the depth dependent variation of orthogonal carrier frequencies. Second, in carrying out the technique, the cosine carrier wave on each orthogonal line has an unknown phase shift. That is, considering the perspective distortion, the image after band-pass filtering can be based on Eqn. (13), such that $$I_n^{BP}(x,y) = I_n'(x,y) \cdot \cos(2\pi(f_n + \delta f)x + \delta\theta). \qquad \text{Eqn. (14)}$$

where $f_n$ has small variation $\delta f$ and $\delta\theta$ is the unknown phase shift. By squaring both sides of Eqn. (14) we have $$(I_n^{BP}(x,y))^2 = (I_n'(x,y))^2 \cdot \frac{1 + \cos(4\pi(f_n + \delta f)x + 2\delta\theta)}{2} \qquad \text{Eqn. (15)}$$

This is low pass filtered by $h_{LP}'(x)$ with a cutoff of $f_n$ such that $$g(x,y) = (I_n^{BP}(x,y))^2 * h_{LP}'(x) = \frac{(I_n'(x,y))^2}{2} \qquad \text{Eqn. (16)}$$

The modulated image is recovered by square rooting Eqn. (16) such that $$I_n^R(x,y) = \sqrt{2g(x,y)} = \sqrt{2 \cdot [(I_n^{BP}(x,y))^2 * h_{LP}'(x)]} \qquad \text{Eqn. (17)}$$

Due to the involvement of the square operation in the demodulation process, $I_n^R(x,y)$ has to be non-negative. Thus, it is effectively an AM based modulation technique which recovers the PMP pattern as the positive envelope. The demodulation procedure is depicted at 40 in FIG. 4. The recovered images $I_n^R(x,y)$ represent the individual patterns in traditional PMP and are used to retrieve the depth of the measured object.

The range data with respect to the reference plane can then be determined according to Eqn. (4) and (5). While one can appreciate from Eqn. (13), leakage error between orthogonal channels occurs when the measured object surface has significant variation of albedo or depth in the orthogonal direction, reconstructed depth in the phase direction is resistant to depth discontinuity and albedo variation.

EXAMPLE 1B

Addendum Summary to Discussion and Analysis employing PMP

As mentioned, one core feature of the technique of the invention is the projection of a composite 20, FIG. 2 of modulated patterns. Assuming scale and offset of the composite function has a transmittance between 0 and 1, the composite image may be represented by the following expression:

$$S_{cp}(x,y) = \sum_{n=1}^{N} f_n(x) \varphi_n(y) \qquad \text{Expression [I]}$$

The structured light pattern set is represented with a 1-D function $f_n(x)$ where x is along the phase dimension. The modulating function is $\varphi_n(y)$ where y is along the orthogonal dimension. The index is n=1, 2, ... N. Drawing from communications concepts to use AM frequency division multiplexing, encode the N patterns. Let $$\varphi_n(y) = A(1 + \cos(2\pi f_{y,n} y)) \qquad \text{Expression [II]}$$

where A is a scaling constant and $f_{y,n}$ is the orthogonal frequency.

The well known multi-pattern PMP technique employed here to provide the structured light patterns for use in the composite pattern, uses phase shifted sinusoids as the projection patterns defined by $$f_n(x) = 1 + \cos(2\pi f_x x + 2\pi n/N) \qquad \text{Expression [III]}$$

where $f_x$ is the spatial frequency and the phase is uniformly shifted from 0 to $2\pi$ as a function of n. Many different types of multi-patterning techniques, including the many optical profilometry techniques, may be employed to profile a surface. The image patterns of PMP are shown in FIG. 2 at 18a-18d where $f_x$ is selected as explained above.

After the composite image is reflected off the object surface, the depth distorts the $f_n(x)$ functions $f_n(g(x_w, y_w, Z_w))$ where $g(.)$ is the distortion of x by the surface world coordinate $\{x_w, y_w, Z_w\}$ as seen by the camera $C_1$. The reflected image is demodulated to get the original patterns which contain the distorted depth, from which the range is calculated. In the process of demodulation, the reflected image may be element-wise multiplied by the orthogonal images. Once again, the original 'now-distorted' patterns can be recovered by demodulation along the orthogonal dimension with the distortion intact (for reference, see FIG. 4). The non-ambiguous depth can be reconstructed from the demodulated patterns using conventional reconstruction.

Figure 5A:
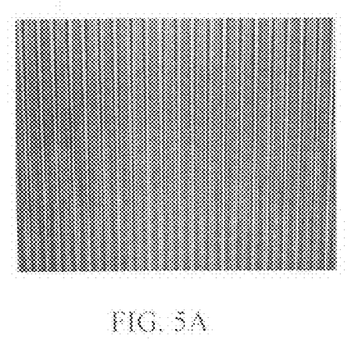
FIG. 5A shows the projection pattern on a reference plane.
Figure 5B:
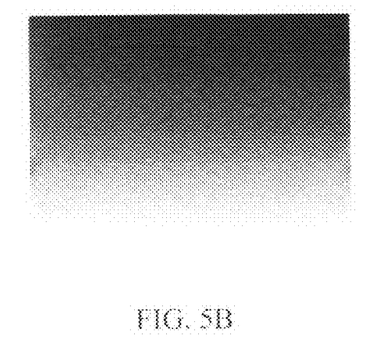
FIG. 5B shows the recovered reference phase mapping for projection of FIG. 5A.
Figure 5C:
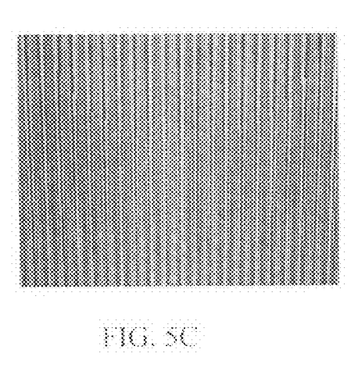
FIG. 5C shows the captured image of the object plane whereby a half-circular step has been placed atop the reference plane of FIG. 5A.
Figure 5D:
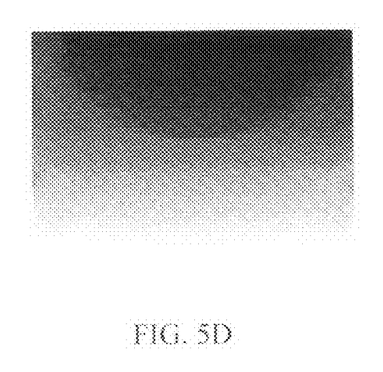
FIG. 5D shows the recovered phase map of the object plane of FIG. 5C.
Figure 6:
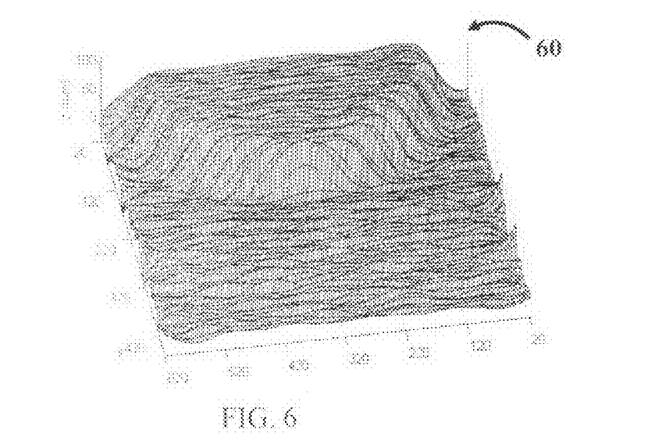
FIG. 6 is a depth mapping of the FIG. 5C object scene having been reconstructed by calculation in a pixel-wise fashion according to Eqn. (4).

FIGS. 5A-5D and FIG. 6 are pictorials representing various stages of carrying out an embodiment of the invention according to EXAMPLE 1C, below. FIG. 5A shows the projection pattern on a reference plane. FIG. 5B shows the recovered reference phase mapping for projection of FIG. 5A. FIG. 5C shows the captured image of the object plane whereby a half-circular step with diameter of 300 mm and thickness of 85 mm has been placed atop the reference plane of FIG. 5A. FIG. 5D shows the recovered phase map of object plane of FIG. 5C. FIG. 6 is a depth mapping 60 of the FIG. 5C object scene having been reconstructed by calculation in a pixel-wise fashion according to Eqn. (4). See, also, FIG. 13 (box 142) as explained above: The phase distribution distorted by the object depth can be calculated (for example, 142a); with the depth, or depth map/mapping, of the object accordingly reconstructed out of the phase (for example, 142b).

Figure 7:
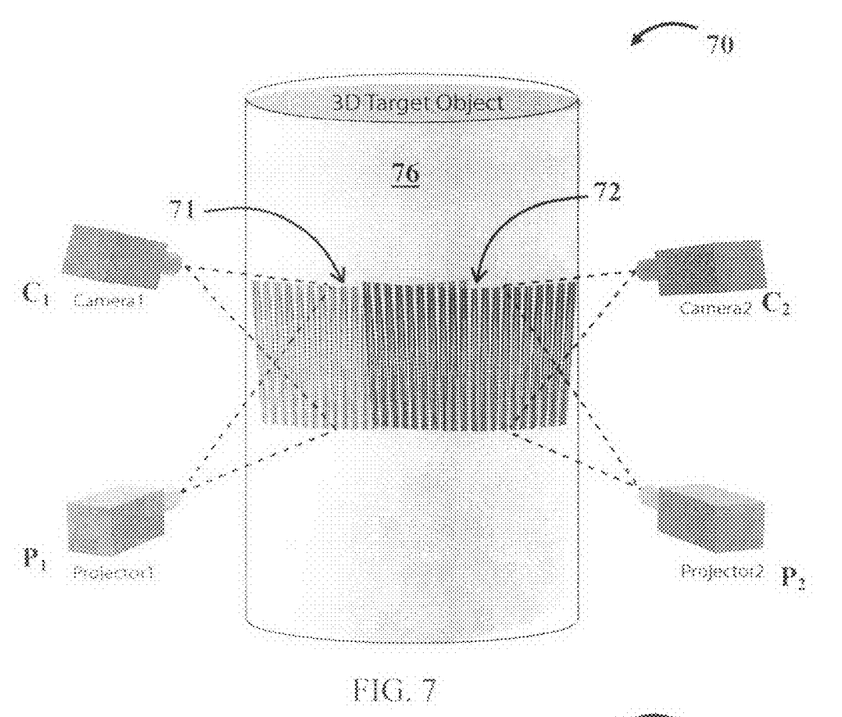
FIGS. 7, 8, and 9A-9B are high-level isometric pictorials, each of which depict a multi-transmitter-receiving unit system 70, 80, 90 having for example, projectors $P_1$, and $P_2$ both projecting to contribute to a respective composite image/region of object surface S, according to alternative techniques: structured light frequency range/bandwidth limited composite technique, composite dimension-unalignment technique, and composite time-sequencing projection technique. Each projector/transmitter is paired with a camera, or other suitable image capture/receiver unit, $C_1$ and $C_2$, positioned for capturing reflected, respective composite images according to the invention.
Figure 8:
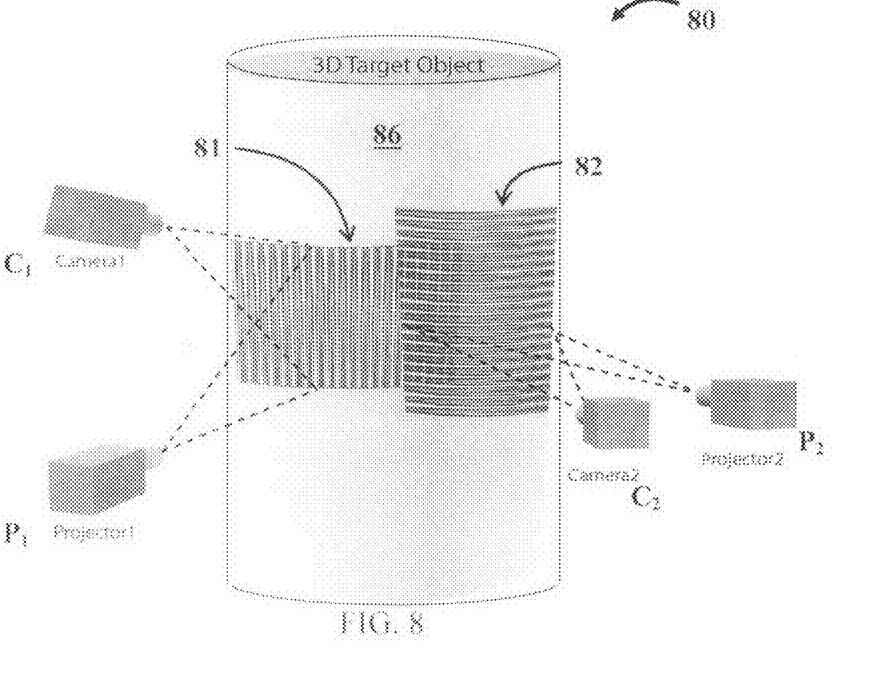
Figure 9A:
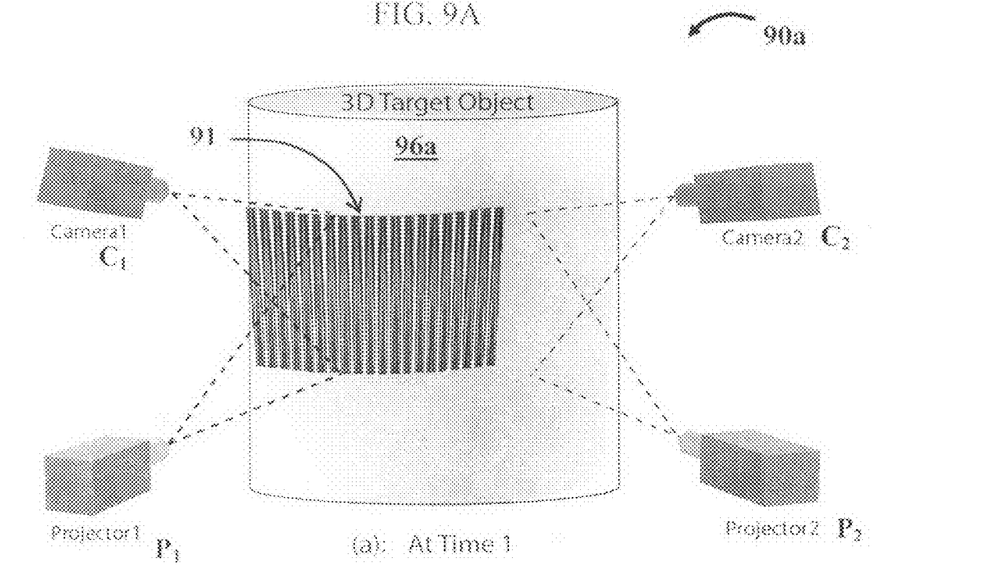
Figure 9B:
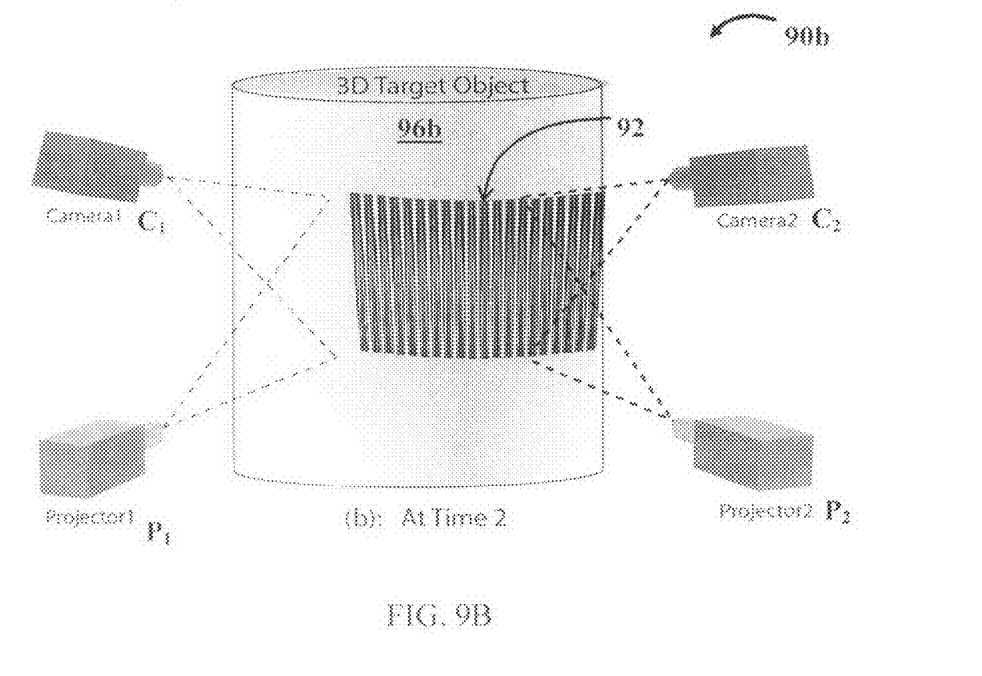

FIGS. 7, 8, and 9A-9B are high-level isometric pictorials, each of which depict a multi-transmitter-receiving unit system 70, 80, 90 having for example, projectors $P_1$, and $P_2$ both projecting to contribute to a respective composite image/region of object surface S, according to alternative techniques: structured light frequency range/bandwidth limited composite technique, composite dimension-unalignment technique, and composite time-sequencing projection technique. Each projector/transmitter is paired with a camera, or other suitable image capture/receiver unit, $C_1$ and $C_2$, positioned for capturing reflected, respective composite images according to the invention. Turning first, to FIGS. 9A-9B which depict a time-sequencing composite projection technique, one can appreciate that this aspect provides an opportunity to, after capturing the first reflected image of the projected composite at 91, projecting a second composite image 92 comprising a second plurality of modulated structured light patterns, at the object 96b so that second pattern information from a second reflected image can be recovered for each of the second plurality of modulated structured light patterns. This feature of time-sequencing composites, shown in FIG. 9A at time T1 as 90a and in FIG. 9B at time T2 as 90b, offers the capability to produce a depth map of the surface(s) of the object using pattern information recovered from two, or more, projected composite images. Such a depth map can reconstruct several surfaces of the object from reflected imaged information received sequentially in time.

FIG. 7 depicts a technique whereby structured light frequency is range, or bandwidth, limited. Here, preferably, the first and second composite images are projected at object 76 (composite 71 projected by $P_1$ and composite 72 projected by $P_2$) using electromagnetic energy radiated within respective first and a second wavelength ranges, whereby the first and second wavelength ranges have no overlap making the composites 'bandwidth limited'. Such a technique provides for a means by which, whether done simultaneously or sequentially, two or more composite images 71, 72 can be projected at the object 76 to gather additional surface information— providing the capability to recover additional depth information and, thus, produce more detailed and/or larger depth mappings.

FIG. 8 depicts, yet another aspect coined composite dimension-unalignment. Here, a second composite image 82 comprising a second plurality of modulated structured light patterns, is projected at the object 86; however, the projection of the second composite image 82 (from projector $P_2$) is oriented such that orthogonal and phase dimensions of the second composite image are unaligned from the orthogonal and phase dimensions of the first projected composite image 81 (from $P_1$). See, also, FIG. 2 for reference. Once again, as in the case of the non-overlapping frequency range alternative above, this aspect of the invention provides an option for simultaneous or sequential projection: two or more composite images can be projected at an object to gather additional surface information.

Figure 10:
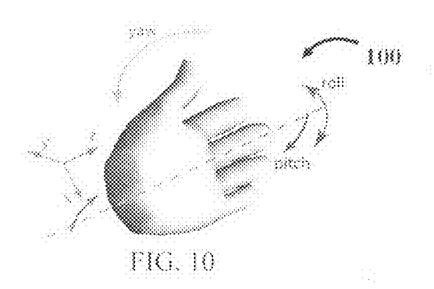
FIG. 10 is an isometric pictorial depicting a reconstructed object, here for example a human hand, along with references as to roll, pitch, and yaw orientations thereof.
Figure 11A:
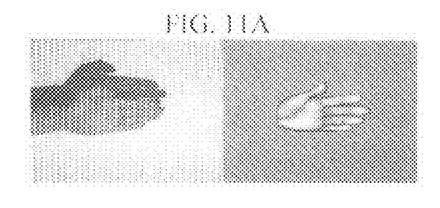
FIGS. 11A-11D are each pictorials depicting different orientations of an object, here for example a human hand, onto which a composite image is projected (shown at left side of each FIG.); with a respective 3D mapping reconstructed from captured reflected images, and shown for each orientation of the hand-object on the right side of each FIG.
Figure 11B:
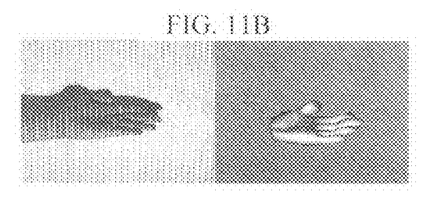
Figure 11C:
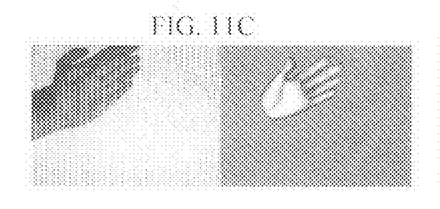
Figure 11D:
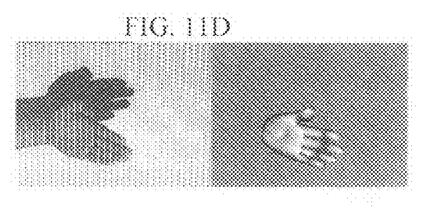
Figure 12A:
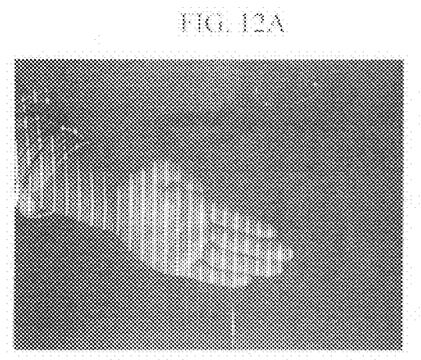
FIGS. 12A-12B are pictorials depicting, respectively, a captured image of a human hand oriented with a pitch angle of −55 degrees onto which a composite has been projected, and a corresponding range image reconstructed therefrom.
Figure 12B:
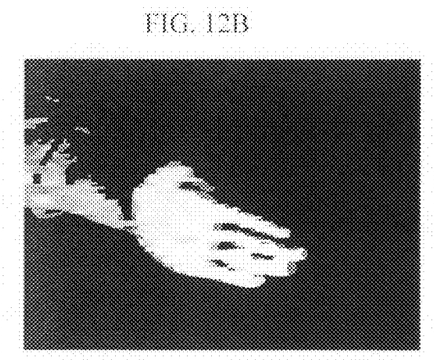

FIG. 10 is an isometric pictorial depicting a reconstructed object 100, here for example a human hand, along with references as to roll, pitch, and yaw orientations thereof. According to the invention, positional coordinate or array data may be used alone or with orientation (146a, 146b, FIG. 13). FIGS. 11A-11D are each pictorials depicting different orientations of an object, here for example a human hand, onto which a composite image is projected (shown at left side of each FIG.); with a respective 3D mapping reconstructed from captured reflected images (box 146, FIG. 13), and shown for each orientation of the hand-object on the right side of each FIG. FIGS. 12A-12B are pictorials depicting, respectively, a captured image of a human hand oriented with a pitch angle of −55 degrees onto which a composite has been projected, and a corresponding range image reconstructed therefrom. In FIG. 12B, the range map represents an intensity coded depth map where the whiter the pixel is, the closer the corresponding world position is along the z-axis (see FIG. 10 for reference). As detailed within boxes 142, 146 and explained further throughout: phase information 142a from recovered patterns can be used to produce depth maps/mappings 142b—whether or not the depth mappings are displayed 144; and alternatively, phase information retrieved from recovered patterns can be used 'directly' to obtain orientation or positional data (146b), useful in operation of any of a number of user-interaction interfaces. Likewise, depth map information may be 'directly' used for recognition of an anatomical feature, e.g., face, head, hand, etc., by comparing prior data records stored of like-kind (146a). For example, a depth map of a face undergoing recognition may be compared with hundreds of thousands or millions (depending on storage size) of records of face depth maps produced earlier (146a).

By way of background, only, in connection with the pictorials of FIGS. 10-12: two known types of input devices commonly used to capture hand movement include a glove-based approach and a computer vision based approach. The glove-based devices are relatively accurate and fast in position tracking. However, they are not suitable for applications where the mechanical devices may impede hand motions. The vision-based approach does not require gloves but it suffers from computational complexity and latency. Certain of the vision approaches are composed of multiple cameras and are built upon stereovision techniques. Other techniques are based on two-dimensional (2D) information which are not robust enough for human computer interaction. Using the 3D information depth information recovered according to the invention, a hand or other movable feature may be more efficiently segmented. Since a world coordinate system may be established for the camera scene in a calibrated projector-camera system, depth information can be obtained using the composite pattern projection of the invention without corruption by object motion. The latency of the interface input is not limited by the projecting speed, which would be the case if employing a traditional multiple-pattern structured light technique, but instead depends on 3D processing speed for a one-shot frame.

Figure 13:
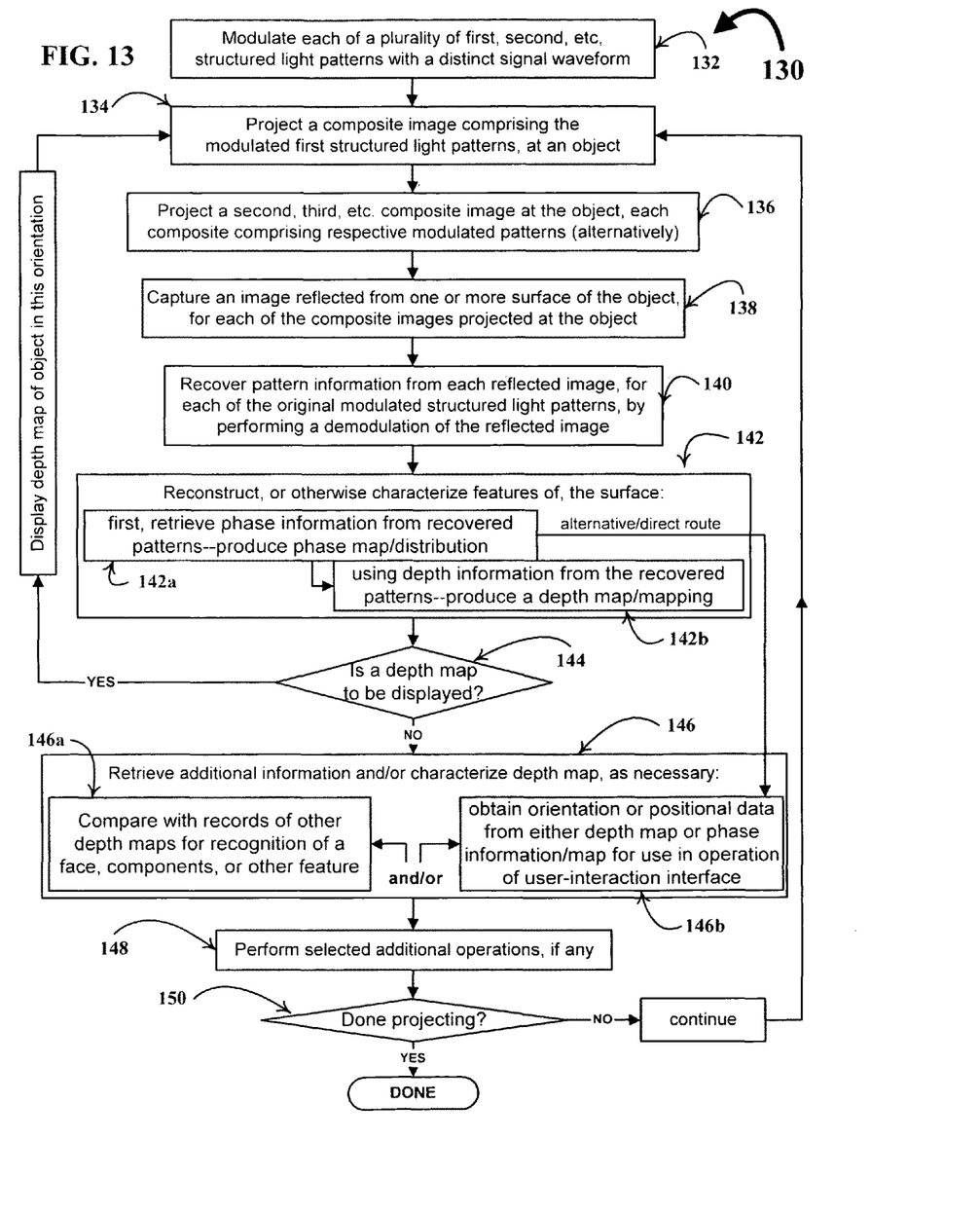
FIG. 13 is a flow diagram depicting details of a method 130 for retrieving depth information about at least one surface of an object according to the invention. Illustrated are core, as well as further distinguishing, features for projecting composite images and/or capturing reflected images such as those represented and depicted in FIGS. 2, 5A-5D, 6, 10, 11A-11D, and 12A-12B, using features of FIGS. 1, 3, 4, 7, 8, 9A-9B.

The following are core steps utilized in the process to produce the pictorials of the hand shown at 100 in FIG. 10, as further illustrated in FIGS. 11A-11D:

(1) Calculate the 3D data from the original captured image according to the invention, generally at 130 FIG. 13; and threshold out the background and the shadows.

(2) Form a 2D hand shape according to the captured image and correlate a hand shaped spatial filter with each image to locate the hand center in the 2D image.

(3) Set a rectangular region with fixed length around the hand center. The centroids along columns of the hand area within the region are calculated. A straight line is generated to fit the centroids in a least squares sense. The yaw angle is the angle in degrees between the straight line and a horizontal line (reference FIG. 10).

(4) Look up the 3D world coordinates corresponding to the rectangular section. The pitch angle is calculated based on the depth values along the fit line from step (3) above, while the roll angle is calculated along the line perpendicular to the fit line.

(5) Smooth the location coordinates and the rotation angles and transfer them to the virtual hand program to manipulate the virtual hand.

As explained above, FIG. 13 is a flow diagram depicting details of a method 130 for retrieving depth information about at least one surface of an object according to the invention. Illustrated are core, as well as further distinguishing, features for projecting composite images and/or capturing reflected images such as those represented and depicted in FIGS. 2, 5A-5D, 6, 10, 11A-11D, and 12A-12B, using features of FIGS. 1, 3, 4, 7, 8, 9A-9B.

EXAMPLE 1C

Summary of Application of Techniques Discussed in Examples 1A-1B

Referencing the various FIGs throughout this EXAMPLE 1C, the following is provided merely for purposes of further understanding the novel features of the invention. A Texas Instruments (TI) Digital Light Processor (DLP) projector, $P_1$, was used with an 800×600 micro-mechanical mirror array. The framegrabber 12, a DT3120, grabs the image from the CCD monochrome camera with spatial resolution of 640× 480 with 8 bits intensity resolution. To simplify decoding, the frequency across the phase direction $f_\phi$ is selected to be unit, or 1, frequency: No unwrapping algorithm need be implemented. In this experiment, number of patterns, N=4; carrier frequencies of the projector $f_n^P$ were 50, 85, 120 and 155 cycles per field of view for an orthogonal field of view width of 800 pixels. The corresponding received carrier frequencies were 33, 56, 79, and 103 cycles per field of view with a field of view of 640 pixels. The lowest modulation frequency was selected to be higher than the difference of the adjacent modulation frequencies to minimize the effect of the ambient light reflection. The order of the Butterworth bandpass filter was selected to be 7 and the width of the passband was 10 to reduce the cross-talk between adjacent channels. FIG. 5A shows the projection pattern on the reference plane and the recovered reference phase map is shown in FIG. 5B. To test sensitivity to depth variation, a half circular step with the thickness of about 85 mm is placed on the top of the reference plane. The reflected image and the corresponding phase map are shown in FIG. 5C and FIG. 5D, respectively. The depths of the object scene were calculated pixel-wise following Eqn. (4) and are shown in FIG. 6. The demodulation procedure generates the edge response effects in the reconstructed depths. The original sharp edges of the circle from the reference plane in the world coordinates were reconstructed with edge transitions between the two depth levels in the depth map due to the band limited filtering. The abrupt edges of the depth act as step edges in the orthogonal direction for all pattern channels.

In further support of the unique features of the 3D face, or other feature, recognition application of the invention (box 146, especially 146a, FIG. 13): 3D face recognition technique of the invention may be based on wavelet and Fourier transforms (particularly the spherical FFT) over the surface of a known object shape—for example, may be a sphere. Just as an audio signal can be decomposed into its spectrogram, the object shape (e.g., a sphere) will be decomposed into its 'spherical spectrogram'—making the new technique effectively orientation invariant. Thus, a computationally efficient technique is for identifying a subject's head position in space, performing a compression of the head shape, and performing face recognition, other anatomical features is contemplated hereby.

While certain representative embodiments and details have been shown for the purpose of illustrating the invention, those skilled in the art will readily appreciate that various modifications, whether specifically or expressly identified herein, may be made to these representative embodiments without departing from the novel teachings or scope of this technical disclosure. Accordingly, all such modifications are intended to be included within the scope of the claims. Although the commonly employed preamble phrase "comprising the steps of" may be used herein in a method claim, Applicants do not intend to invoke 35 U.S.C. §112 ¶6. Furthermore, in any claim that is filed herewith or hereafter, any means-plus-function clauses used, or later found to be present, are intended to cover at least all structure(s) described herein as performing the recited function and not only structural equivalents but also equivalent structures.

What is claimed is:

1. A method for performing recognition of an anatomical feature using depth information about a surface of the anatomical feature, comprising the steps of:
   modulating each of a plurality of structured light patterns using a respective carrier frequency along the orthogonal dimension;
   projecting a composite image comprising said plurality of modulated structured light patterns, at the anatomical feature; and
   recovering pattern information from an image reflected from the surface, for each of said plurality of modulated structured light patterns.

2. The method of claim 1 wherein said step of recovering said pattern information comprises performing a demodulation of said reflected image, said pattern information so recovered from said plurality of structured light patterns comprising the depth information; and further comprising the step of reconstructing the surface using the depth information.

3. The method of claim 2 wherein: each said modulated structured light pattern was obtained by modulation with a signal waveform associated with said respective carrier frequency; and said step of reconstructing comprises producing a depth map of the surface using said recovered pattern information.

4. The method of claim 3 further comprising the step of comparing said depth map with a plurality of stored depth map records of animal features of like-kind as that undergoing recognition, for purposes of identification of the anatomical feature.

5. The method of claim 2 wherein the anatomical feature is selected from the group consisting of: a face, a facial feature, a head shape, and a hand.

6. The method of claim 2 wherein: said step of performing a demodulation comprises performing said demodulation along said orthogonal dimension producing a recovered pattern information for each of said plurality of modulated structured light patterns; and said step of reconstructing comprises producing a depth map of the surface using said recovered pattern information.

7. The method of claim 2 wherein said step of performing a demodulation comprises performing said demodulation along said orthogonal dimension; and further comprising the step of displaying said reconstructed surface.

8. The method of claim 7 wherein: said projected composite image comprises electromagnetic energy radiated within a wavelength range from 180 nm through 2000 nm; the image reflected from the surface is captured by receiving and recording pixel intensity and pixel wavelength of the energy reflected from the surface; and said step of displaying further comprises displaying the object in three-dimensional space.

9. The method of claim 1 further comprising the steps of:
projecting a second composite image comprising a second plurality of modulated structured light patterns, at the anatomical feature; and
recovering second pattern information from a second reflected image, for each of said second plurality of modulated structured light patterns.

10. A method for obtaining orientation data about an anatomical feature using information retrieved from a surface of the anatomical feature, comprising the steps of:
modulating each of a plurality of structured light patterns using a respective carrier frequency along the orthogonal dimension;
projecting a composite image comprising said plurality of modulated structured light patterns, at the anatomical feature; and
recovering pattern information from an image reflected from the surface, for each of said plurality of modulated structured light patterns.

11. The method of claim 10 wherein said step of recovering said pattern information comprises performing a demodulation of said reflected image, said pattern information so recovered from said plurality of structured light patterns comprising information selected from the group consisting of: depth information and phase information.

12. The method of claim 10 wherein: each said modulated structured light pattern was obtained by modulation with a signal waveform associated with said respective carrier frequency; and the anatomical feature is selected from the group consisting of a face, a facial feature, a head shape, and a hand.

13. The method of claim 10 wherein said orientation data obtained comprises data selected from the group of roll angle data, pitch angle data, yaw angle data, and positional data, for use in connection with operation of a user-interaction interface for a computerized device.

14. The method of claim 10 further comprising the steps of:
projecting a second composite image comprising a second plurality of modulated structured light patterns, at the anatomical feature; and
recovering second pattern information from a second reflected image, for each of said second plurality of modulated structured light patterns.

15. A system for performing recognition of an anatomical feature using depth information about a surface of the anatomical feature under observation by at least one camera, the system comprising:
at least one projector adapted for projecting at least one composite image at the anatomical feature, said composite image comprising a plurality of modulated structured light patterns, each having been modulated using a respective carrier frequency along the orthogonal dimension;
the camera adapted for capturing an image being reflected from the surface; and
a processor adapted for recovering pattern information from said reflected image, for each said plurality of modulated structured light patterns: the depth information retrievable from said recovered pattern information.

16. The system of claim 15 wherein each said modulated structured light pattern was obtained by modulation with a distinct signal waveform associated with said respective carrier frequency; said processor is further adapted to recover said pattern information by performing a demodulation along said orthogonal dimension of said reflected image; and the depth information is used to produce a depth map of the surface.

17. The system of claim 16 wherein: each said signal waveform used for said modulation of a respective structured light pattern, is distinct from each other of said signal waveforms used for said modulation of other structured light patterns; and each said distinct signal waveform is selected from the group consisting of frequency shifted waveforms, phase shifted waveforms, random noise waveforms, and encoded waveforms.

18. The system of claim 16 wherein said processor is further adapted to: reconstruct the surface using the depth information; and compare said depth map with a plurality of stored depth map records of animal features of like-kind as that undergoing recognition, for purposes of identification of the anatomical feature.

19. The system of claim 15 wherein the anatomical feature is selected from the group consisting of: a face, a facial feature, a head shape, and a hand.

20. A system for obtaining orientation data about an anatomical feature using information retrieved from a surface of the anatomical feature under observation by at least one camera, the system comprising:
at least one projector adapted for projecting at least one composite image at the anatomical feature, said composite image comprising a plurality of modulated structured light patterns, each having been modulated using a respective carrier frequency along the orthogonal dimension;
the camera adapted for capturing an image being reflected from the surface; and
a processor adapted for recovering pattern information from said reflected image, for each said plurality of modulated structured light patterns.

21. The system of claim 20 wherein each said modulated structured light pattern was obtained by modulation with a distinct signal waveform associated with said respective carrier frequency; said processor is further adapted to recover said pattern information by performing a demodulation of said reflected image; said pattern information so recovered from said plurality of structured light patterns comprising information selected from the group consisting of: depth information, and phase information.

22. The method of claim 20 wherein: the anatomical feature is selected from the group consisting of a face, a facial feature, a head shape, and a hand; and said orientation data obtained comprises data selected from the group of roll angle data, pitch angle data, yaw angle data, and positional data, for use in connection with operation of a user-interaction interface for a computerized device.

23. A non-transitory computer readable storage medium having stored thereon, program code for performing recognition of an anatomical feature using depth information about a surface of the anatomical feature under observation by at least one camera, the program code comprising:
   a first program sub-code for modulating each of a plurality of structured light patterns using a respective carrier frequency along the orthogonal dimension and projecting a composite image comprising said plurality of modulated structured light patterns, at the anatomical feature;
   a second program sub-code for recovering pattern information from an image reflected from the surface, for each said plurality of modulated structured light patterns; and
   a third program sub-code for retrieving the depth information from said recovered pattern information.

24. The storage medium of claim 23 wherein:
   said first program sub-code comprises instructions for modulating each said plurality of structured light patterns with a distinct signal waveform associated with said respective carrier frequency;
   said second program sub-code comprises instructions for performing a demodulation of said reflected image to produce a recovered pattern information for each of said plurality of modulated structured light patterns; and
   said third program sub-code comprises instructions for producing a depth map of the surface using said recovered pattern information.

25. The storage medium of claim 24 wherein the program code further comprises a fourth program sub-code for comparing said depth map with a plurality of stored depth map records of animal features of like-kind as that undergoing recognition, for purposes of identification of the anatomical feature.

26. The program code of claim 23 further comprising:
   a fourth program sub-code for projecting, after said recovering pattern information, a second composite image comprising a second plurality of modulated structured light patterns, at the anatomical feature; and
   a fifth program sub-code for producing a depth map of the surface using (a) the depth information from said recovered pattern information, and (b) pattern information recovered for each of said second plurality of modulated structured light patterns.

27. A non-transitory computer readable storage medium having stored thereon, program code for obtaining orientation data about an anatomical feature using additional information retrieved from a surface of the anatomical feature under observation by at least one camera, the program code comprising:
   a first program sub-code for modulating each of a plurality of structured light patterns using a respective carrier frequency along the orthogonal dimension and projecting a composite image comprising said plurality of modulated structured light patterns, at the anatomical feature;
   a second program sub-code for recovering pattern information from an image reflected from the surface, for each said plurality of modulated structured light patterns; and
   a third program sub-code for retrieving the additional information from said recovered pattern information, said additional information selected from the group consisting of: depth information, and phase information.

28. The storage medium of claim 27 wherein the orientation data comprises data selected from the group of roll angle data, pitch angle data, yaw angle data, and positional data, for use in connection with operation of a user-interaction interface for a computerized device.

29. The program code of claim 27 wherein the additional information retrieved from said recovered pattern information is depth information, and further comprising:
   a fourth program sub-code for projecting, after said recovering pattern information, a second composite image comprising a second plurality of modulated structured light patterns, at the anatomical feature; and
   a fifth program sub-code for producing a depth map of the surface using (a) the depth information from said recovered pattern information, and (b) pattern information recovered for each of said second plurality of modulated structured light patterns.

* * * * *